Feb. 5, 1929.　　　　　　　　　　　　　　　　1,701,362
C. H. HADDRELL
DYNAMO ELECTRIC MACHINE
Filed Aug. 8, 1927
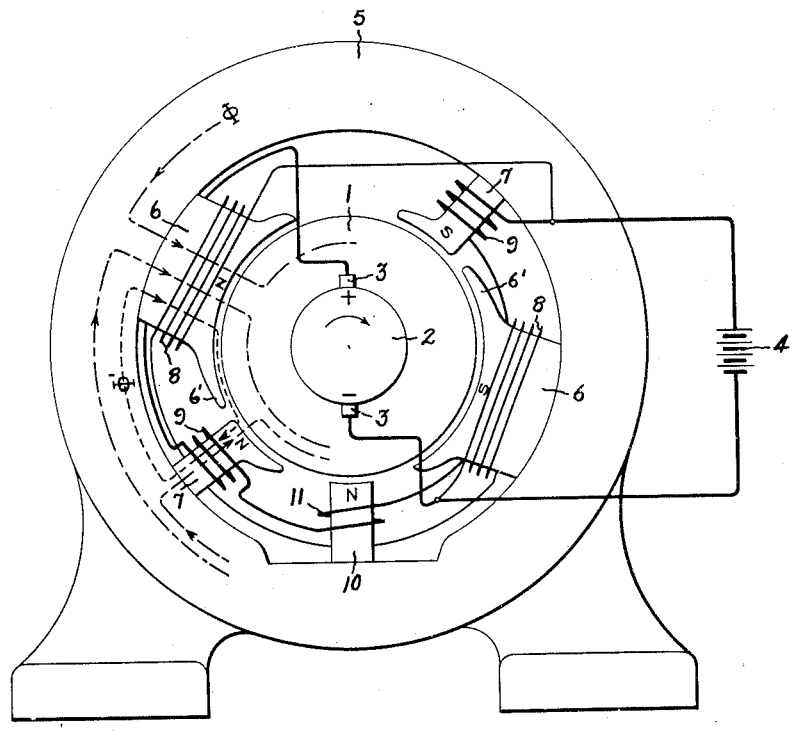
Inventor:
Charles H. Haddrell,
by
His Attorney.

Patented Feb. 5, 1929.

1,701,362

UNITED STATES PATENT OFFICE.

CHARLES H. HADDRELL, OF SWAMPSCOTT, MASSACHUSETTS, ASSIGNOR TO GENERAL ELECTRIC COMPANY, A CORPORATION OF NEW YORK.

DYNAMO-ELECTRIC MACHINE.

Application filed August 8, 1927. Serial No. 211,283.

My invention relates to dynamo-electric machines and more particularly to dynamo-electric machines normally operated as generators and adapted for charging storage batteries.

In the constant-potential system of charging storage batteries it is important to maintain the charging bus at a voltage which is accurately constant, otherwise, overheating and violent gassing may occur in the battery under charge. A compound-wound generator provides a simple arrangement without accessory regulating devices whereby a satisfactory voltage may be maintained throughout the period of charge. However, when using a compound-wound generator of usual construction, in which the shunt and series coils are positioned coaxially on the same core, any condition which causes the battery to drive the generator as a motor will cause reversal of current in the series or compounding winding and depending upon the relative strengths of the series and shunt fields, the main or shunt field may be materially reduced or overcome so that the motoring generator attains an excessive speed or has its polarity reversed. Speed limit devices, or reverse current or reverse power devices may be used to protect against excessive speed conditions but these devices do not ordinarily act quickly enough to reduce the susceptibility to reversal of polarity sufficiently for entirely satisfactory results in commercial installations.

It is an object of my invention to provide an improved compound-wound type of dynamo-electric machine which shall provide a predetermined voltage regardless of variations in load and which shall be free from liability to reversed polarity when used in combination with translating devices having operating characteristics tending to cause reversal of polarity and excessive speed in compound-wound dynamo-electric machines of usual construction.

Another object of my invention is to provide an improved type of dynamo-electric machine adapted for use in constant-potential storage battery charging systems.

The novel features which I believe to be characteristic of my invention are set forth with particularity in the appended claims. The invention itself, however, both as to organization and method of operation together with further objects and advantages thereof will best be understood by reference to the following description taken in connection with the accompanying drawing in which the single figure is a diagrammatic representation of one embodiment of my invention.

Referring to the drawing, 1 represents the armature of a two-pole direct-current type of dynamo-electric machine having the usual commutated armature winding (not shown), provided with a commutator 2, and commutator brushes 3 connected to leads through which direct current may be transmitted from the machine to the battery 4. The field yoke is designated by 5.

In accordance with my invention the field excitation system comprises a plurality of field magnet cores each of which is divided into a main portion 6 and an auxiliary portion 7. The main core portion 6 is provided with an exciting winding 8 which is connected in parallel relation with the armature circuit and is arranged to carry an exciting current proportional to the terminal voltage for furnishing at a substantially constant value a substantial portion of the armature flux. The auxiliary core portion 7 is provided with an exciting winding 9 which is connected in series relation with the armature circuit and arranged to carry an exciting current proportional to the armature current for furnishing a compounding flux. The auxiliary core portion 7 is positioned in close proximity to the main core portion 6 but is separated therefrom throughout its length. The auxiliary core portions 7 are positioned on the same side of their corresponding main portions 6, namely, on the leading side or on the trailing side proceeding in the direction of rotation of the armature, but, as shown, each auxiliary portion is preferably positioned on the leading side of its corresponding main portion. The core portion 7 is thus so positioned that the compounding flux is introduced into the armature between the brush line or line of commutation and the region at which flux is introduced by the main core portion 6.

The main core portion 6 is provided with pole tips which are separated from the auxiliary core portion 7. In a commercial embodiment of my invention I have found that for the usual regulation requirements it is preferable, as shown, to use pole tips on the main core portion of unequal length with the longer or leading pole tip 6' extended toward the auxiliary core portion 7 but separated therefrom by an air gap which is greater than the air gap between the pole face of the main portion and the armature. The location of the auxiliary portion and relation between pole-tip gap and armature gap is governed largely by the regulation requirements so that it is to be understood that my invention is not limited to the exact position or air gap relations shown and specified. The complete separation of the core portions throughout their lengths prevents excessive leakage between the two adjacent portions and thereby reduces materially the amount of copper required on the main core portions.

The series winding 9 produces a flux in addition to the main shunt winding 8 to maintain the generator voltage constant with increasing load just as in the usual type of compound-wound machine but in this case the compounding characteristics are obtained without danger of excessive speed and reversal of polarity when the generator operates as a motor. This will be apparent by referring to the drawing and considering the indicated average flux paths under conditions of normal and reverse series pole energization. For purposes of explanation, the poles to the left of the figure are indicated as the north poles and the poles to the right are indicated as the south poles. The portions of the average flux paths out of the north poles and into the armature under normal generator conditions are indicated by the dot-dash lines and designated by $\Phi$, while the principal leakage flux path during motor operation between adjacent core portions is indicated by the broken line of equal length dashes and designated by $\Phi'$. It will be observed that for normal operation the flux in adjacent core portions is in the same direction and consequently both portions are of like polarity.

Now if it is assumed that the battery voltage is higher than the generator voltage, there will be no change in the direction of current flow in the shunt field since the shunt field terminals are connected to points having the same polarity as for generator operation and no change occurs in the direction of the current or flux. The current in the series field, however, will reverse and the direction of the flux in the auxiliary core portion will be reversed. The path of the flux from the former north-pole auxiliary core portion will now be through the yoke 5, down through the main core portion 6 in the same direction as the shunt field flux, then through the pole tip 6', and up through the auxiliary core portion 7. Hence, there is no tendency to reverse the polarity of the shunt or main field pole or materially reduce the flux therefrom.

For purposes of commutation it is found desirable, particularly in machines of large size, to use commutating poles. I have found, however, that for a machine rated at a normal load of 200 amperes, it is only necessary to use a single commutating pole in a two-pole machine, said commutating pole comprising a core 10 and a winding 11 connected in series relation with the armature circuit and arranged to carry an exciting current proportional to the armature current. This pole is arranged to have a polarity which is the same as the main pole proceeding in the direction of rotation and in the arrangement shown is a north pole. When using a single commutating pole or half the number corresponding to the interpolar spaces it is necessary to furnish substantially twice the amount of commutating flux from the single pole or half the number of poles as compared to the arrangements in which a pole is used in each interpolar space since the commutating flux introduced into the commutating zone is effective on only one side of an armature coil.

In machines of smaller capacity than those previously mentioned, such as machines of 100 ampere normal rated load, it has been found that satisfactory commutation may be obtained by shifting the brushes in the direction of rotation so that the brushes come under the influence of the flux from the auxiliary core portions 7.

While I have shown and described a particular embodiment of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In a dynamo-electric machine having an armature and an armature winding thereon, a plurality of field magnets each comprising main and auxiliary core portions separated throughout their lengths, each of said auxiliary core portions being positioned on the same side of its corresponding main portion proceeding in the direction of rotation of said armature and in closer proximity to its corresponding main portion than to said other main portions, a winding on each of said main portions positioned substantially coaxially therewith and connected in parallel relation with said armature winding, and a winding on each of said auxiliary portions positioned substantially coaxially therewith and connected in series relation with said armature winding.

2. In a dynamo-electric machine, an armature, a plurality of field magnet poles each subdivided throughout its length into two unequal portions, the smaller portion of each field magnet pole being positioned on the leading side of the greater portion proceeding in the direction of rotation of said armature, a winding on said greater portions adapted for establishing a substantially constant flux therein, and a winding on said smaller portions adapted for establishing a variable and regulating flux therein.

3. In a dynamo-electric machine, an armature, a plurality of field magnet poles each subdivided throughout its length and comprising a main portion and an auxiliary portion on the leading side thereof proceeding in the direction of rotation of said armature, and pole tips of unequal length on said main portion having the longer tip extending toward said auxiliary portion and separated therefrom by an air gap.

4. In a dynamo-electric machine, an armature, a plurality of main field magnet poles, poles separated therefrom and positioned at a point in advance of said main poles proceeding in the direction of rotation of said armature between said main poles and the commutating zone of said dynamo-electric machine, and a pole having its axis in the commutating zone of said dynamo-electric machine.

5. In a dynamo-electric machine having an armature, a field excitation system therefor comprising a plurality of energizing coils for supplying main, compounding and commutating fluxes, and separated magnetic cores for each of said coils, each of said compounding coils and cores being positioned to introduce a flux into the armature in a region between the regions at which flux is introduced by said main coil and said commutating coil.

6. The combination with a dynamo-electric machine comprising an armature circuit and main field magnet cores and windings, of a storage battery connected to said armature circuit, and means for controlling the voltage of said dynamo-electric machine when operating to supply energy to said storage battery and for preventing reversal of polarity of said main cores when said storage battery supplies energy to said dynamo-electric machine comprising auxiliary magnetic cores separated from and disposed on the leading side in close proximity to each of said main winding cores proceeding in the normal direction of rotation of said dynamo-electric machine, and an auxiliary field winding energized in accordance with variations in load current and positioned on said auxiliary magnetic cores.

7. The combination with a dynamo-electric machine comprising an armature circuit and main field magnet cores and windings, of a storage battery, means for controlling the voltage of said dynamo-electric machine when operating to supply energy to said storage battery and for preventing reversal of polarity in said main cores when said storage battery supplies energy to said dynamo-electric machine comprising auxiliary magnetic cores separated throughout their lengths from said main cores and interposed on the leading side thereof proceeding in the normal direction of rotation of said dynamo-electric machine between said main cores and the axis of the commutating zone of said dynamo-electric machine, an auxiliary field winding arranged on said auxiliary cores and connected in series relation with said storage battery, and a second auxiliary winding connected in series relation with said storage battery and arranged for introducing a flux in the commutating zone of said dynamo-electric machine.

In witness whereof, I have hereunto set my hand this fourth day of August, 1927.

CHARLES H. HADDRELL.